E. R. CLARKE.
DYNAMO ELECTRIC MACHINE.
APPLICATION FILED OCT. 4, 1912.
1,200,312.
Patented Oct. 3, 1916.
2 SHEETS—SHEET 1.
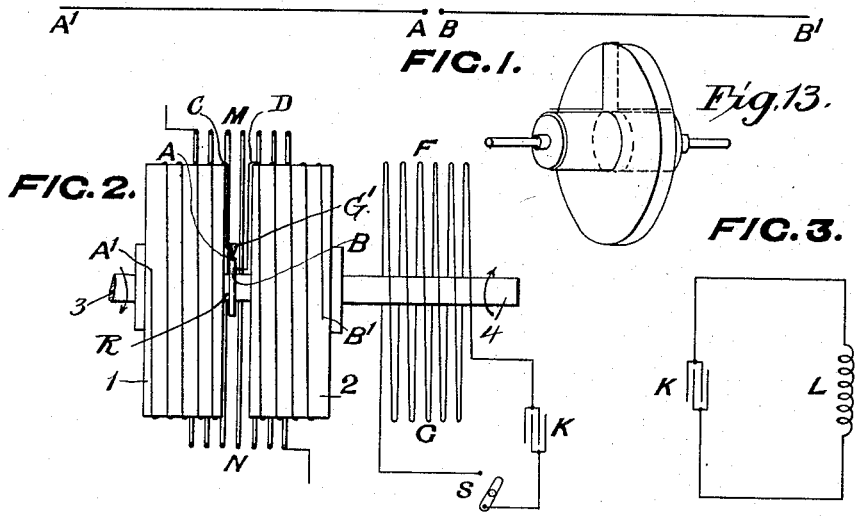
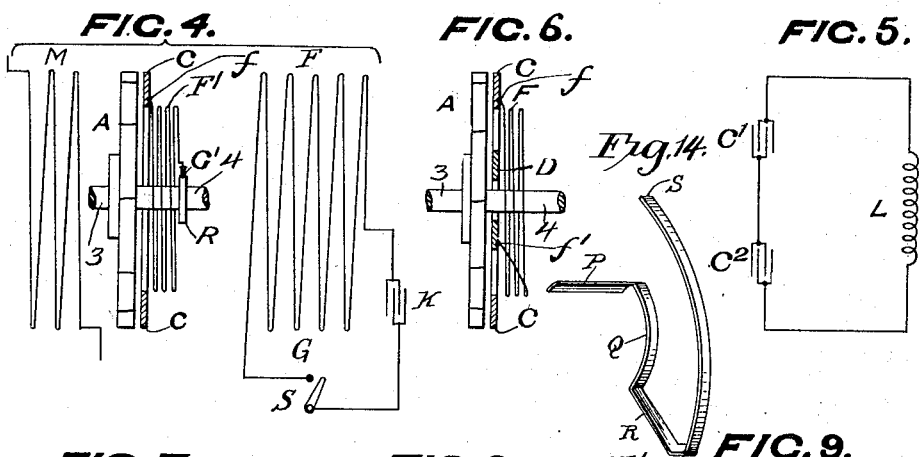
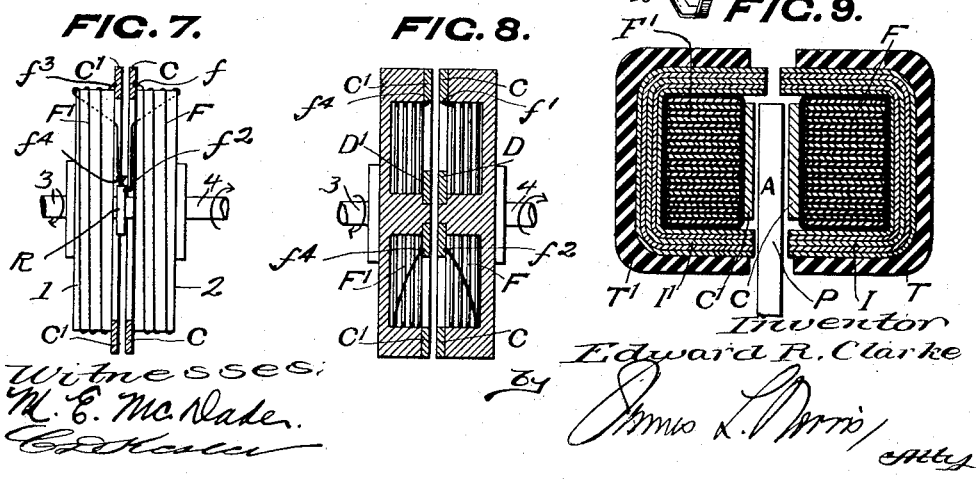
Witnesses:
M. E. McDade.
Inventor
Edward R. Clarke
by
James L. Norris
Atty E. R. CLARKE.
DYNAMO ELECTRIC MACHINE.
APPLICATION FILED OCT. 4, 1912.
1,200,312.  Patented Oct. 3, 1916.
2 SHEETS—SHEET 2.
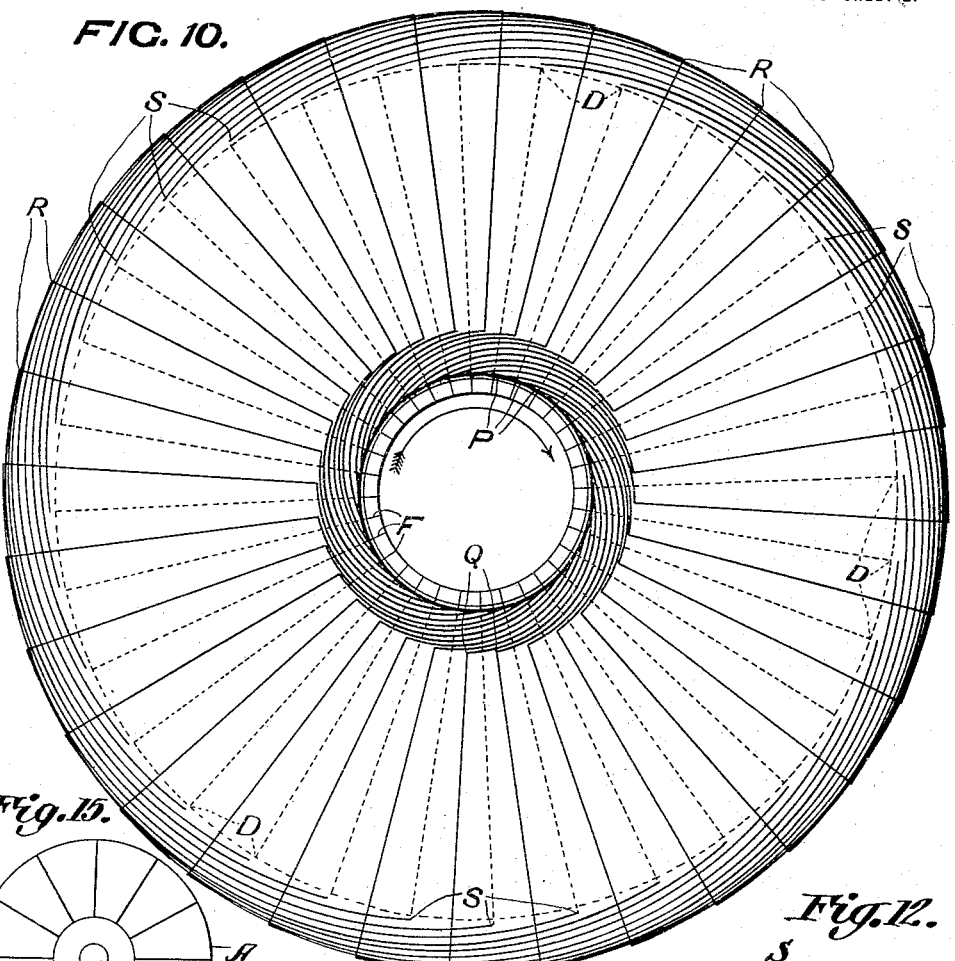
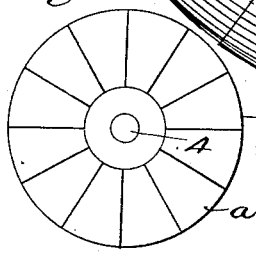
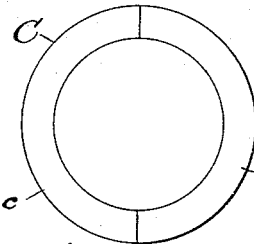
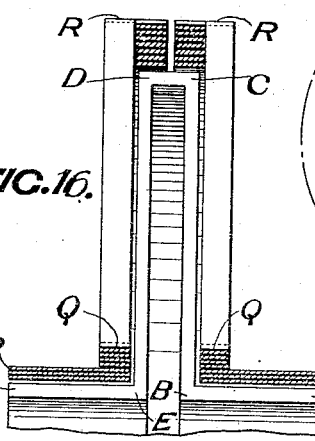
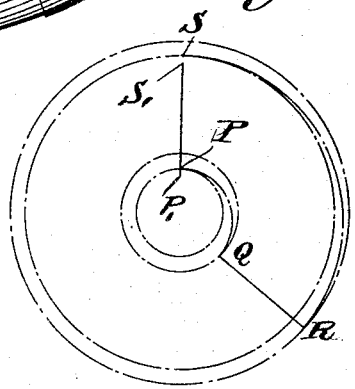
Inventor
Edward R. Clarke

UNITED STATES PATENT OFFICE.

EDWARD RUSSELL CLARKE, OF LONDON, ENGLAND.

DYNAMO-ELECTRIC MACHINE.

1,200,312.  Specification of Letters Patent.  Patented Oct. 3, 1916.

Application filed October 4, 1912. Serial No. 723,907.

*To all whom it may concern:*

Be it known that I, EDWARD RUSSELL CLARKE, a subject of the King of Great Britain, residing at No. 35 Leinster Gardens, Hyde Park, London, W., England, have invented certain new and useful Improvements in Dynamo-Electric Machines, of which the following is a specification.

This invention relates to dynamo electric machines and has for its object the production of alternating current of any desired frequency.

The invention is specially applicable to the production of oscillatory currents such as are used in wireless telegraphy.

According to this invention I provide an oscillating circuit containing inductance and capacity. In such a circuit if an oscillation is started it will as is well known persist for a certain time with continually diminishing amplitude until the oscillations die out.

By means of the present invention I am enabled to supply energy to the circuit in such a way that the oscillations are maintained and the decrement is reduced to zero so that a continuous oscillation is produced.

It has already been suggested to maintain electrical oscillations in a circuit by allowing one portion of the circuit to produce an oscillating electric field while another portion of the circuit is rotated so as to cut such field. Such suggestion has hitherto been found impracticable owing to the impossibility of constructing a machine with sufficiently low internal resistance, the difficulty being largely due to the inevitable drop of voltage at the sliding contacts of the machine.

The basis of this invention is an arrangement for maintaining electrical oscillations by means of a unipolar machine the field of which is formed by the inductance of the oscillating circuit.

The novelty in this invention consists in the fact that the transfer of energy between a stationary and a moving part or between the two parts of the oscillating circuit which move in opposite directions is effected through a condenser or condensers one side of which rotates or rotate relatively to the other, thus doing away with slip rings and brushes, at any rate at the periphery, and the consequent loss of voltage due thereto. In this way it has for the first time become possible to build a machine of such low internal resistance that the oscillations are capable of being maintained.

The inductance forming part of the oscillating circuit is arranged as the field coil or coils of a dynamo of the homopolar type so that an alternating field of the natural frequency of the oscillations is produced. A portion of the oscillating circuit takes the form of a conductor or conductors which are caused to rotate within this field and in which an E. M. F. will be produced (owing to cutting the lines of such field) in phase with the current oscillation at the moment flowing therein.

In order that a machine operating as above described may maintain the oscillations it is necessary that its internal resistance should be very low, and according to this invention I am able to obtain such a low resistance dynamo by eliminating all peripheral rubbing or sliding contacts, and substituting condensers or their equivalent whose parts move relatively to one another therefor. The transfer of energy between the relatively moving parts then takes place through the dielectric.

In order that the invention may be readily understood I first proceed to describe the same with reference to the accompanying drawings which show diagrammatically various forms in which the invention may be carried out.

Figures 1-9 represent diagrammatically the elementary principles of the invention showing how oscillations are maintained in oscillating circuits of different forms. Fig. 1 represents an open oscillating circuit and Fig. 2 shows diagrammatically the necessary elements for maintaining an oscillation therein. Fig. 3 represents a closed oscillating circuit with one condenser and Fig. 4 shows the necessary elements for maintaining an oscillation therein. Fig. 5 represents a closed oscillating circuit with two condensers and Fig. 6 shows the necessary elements for maintaining an oscillation therein. Figs. 7 and 8 show modifications of Fig. 6. Fig. 9 shows a magnetic circuit applicable to the foregoing figures. Figs. 10 and 11 show the actual windings of the rotor and stator of a machine constructed in accordance with the present invention, Fig. 10 showing the rotor and stator as viewed axially, and Fig. 11 representing a section taken radially through the upper halves of the rotor and stator. Fig. 12 is a diagrammatic view showing the winding of the stator. Fig. 13 is a diagrammatic view showing the rotor in perspective and illustrating one of the radial windings on the rotor. Fig. 14 is a perspective view of one of the windings of the stator. Fig. 15 is a face view of the disk as shown in Figs. 4 and 6. Fig. 16 is a face view of the ring as shown in Fig. 4.

The most elementary illustration of the principle of the invention will be described with reference to Figs. 1 and 2.

Referring to Fig. 1 which shows a straight wire $A^1$ $B^1$ provided with a spark gap A B at its center, it is well known that if the spark balls A B are connected to a suitable source of high tension electricity such as an induction coil or high tension transformer that an oscillating current will be set up in wire $A^1$ $B^1$. In order to adapt this form of oscillating circuit so that oscillations may be maintained therein, I wind the wire A $A^1$ on the periphery of a disk 1 of non-conducting material and the wire B $B^1$ on the periphery of the disk 2 of non-conducting material as shown diagrammatically in Fig. 2 the ends A B being joined near the axis of the respective disks and the ends $A^1$ $B^1$ being left free on the periphery. These two disks are mounted coaxially face to face on shafts 3 and 4 which are driven respectively in opposite directions at a high speed by any suitable mechanical driving means operating on those shafts, electrical connection being made between the wires at the points A and B through a brush G' and a coöperating slip ring R, the latter being arranged on the inner ends of the shafts. It will be seen that the oscillating circuit is the same as in Fig. 1 except that the wires A $A^1$ B $B^1$ have been formed into circular coils with the ends A B at the centers of the respective disks so that the portions A C and B D (Fig. 2) form radii of the disks, the direction of winding being such that the field produced by the coil A $A^1$ is in the same direction as the field produced by the coil B $B^1$ when a current is oscillating in the whole wire so that if a spark gap were inserted between A and B and supplied with energy from a suitable source, an oscillation would be produced in the circuit $A^1$ A B $B^1$ as was the case in Fig. 1.

Instead of inserting a spark gap between A and B, I electrically connect the points A B by a brush G' coöperating with a slip ring R whereby the disks can be rotated relatively to one another and I preferably rotate the disk 1 in one direction and the disk 2 in the opposite direction by power imparted to the respective shafts 3 and 4, although I may if preferred maintain one disk stationary and rotate the other disk relatively thereto by imparting motion mechanically to one of these shafts only.

If an oscillation is started in the circuit A $A^1$ B $B^1$ when the disks are in rapid rotation the radii A C and B D will cut the magnetic lines produced by the oscillating current flowing in the circular coils and an E. M. F. will be generated therein in phase with the oscillating current already existing in the circuit, and if the resistance of the circuit could be made sufficiently low and the velocity of rotation were sufficiently high the oscillations would be maintained in spite of power being taken from the machine in the manner hereinafter described.

In order to excite the machine, I may either spark on to the periphery of one of the disks or may provide a tuned circuit F G inductively coupled with the coils and containing a condenser K and a spark gap S. In order to take power from the machine, I may provide an inductively coupled circuit M N preferably tuned which may form part of the aerial if the apparatus is to be used for wireless telegraphy. In this form of the machine which is given as illustrating the principle of the invention there is no condenser of the usual form but the free ends of the wires act in effect as a condenser.

Fig. 3 shows a form of oscillating circuit containing an inductance L and condenser K, which form of circuit permits larger quantities of energy to oscillate at a given potential. I adapt this circuit to the object of the invention as shown in Fig. 4 in which A is a disk capable of rapid rotation by motion transmitted thereto by the shaft 4, and this disk is in juxtaposition to a ring C loosely surrounding the said shaft, the periphery of the disk A and the ring C being the equivalent of the condenser K shown in Fig. 3, the inductance L is wound as a circular coil F' connected at one end $f$ to the ring C and at the other end to a brush G' bearing on a slip ring R carried by the shaft 4 of the disk A. The disk A consists of a number of radial conductors $a$, as shown in Fig. 14, and the ring C is divided radially into one or more parts $c$, as shown in Fig. 15, so that the oscillations in coil F' cannot produce circulating currents either in the disk A or in the ring C. The machine is provided with an exciting coil F and a coil M for taking power therefrom as already described with reference to Fig. 2, the necessary rotation being imparted to the disk A by the shaft 4.

The action of this form of the machine is identical with that shown in Fig. 2. As the current which is induced in the coil F' by the exciting coil F, G flows in and out of the condenser formed by disk A and the ring C it passes around the coil F' and thereby generates an oscillating field the lines of which are cut by the radii $a$ of the disk A in which radii an E. M. F. maintaining the oscillations is produced in phase with the current already existing therein. A similar ring and coil can be placed on the other side of the disk which greatly adds to the efficiency of the machine. In order to do away with the resistance offered by the rubbing contact between the brush G' and the slip ring R, I may substitute therefor a second ring D within the ring C which forms a condenser with the central portion of the disk as shown in Fig. 6. One end of the coil F is connected at $f$ to the ring C and the other end to the ring D at $f'$ as shown. The oscillating circuit of which this is the equivalent is shown conventionally in Fig. 5 in which L represents the inductance corresponding to the coil F and $C^1$ and $C^2$ show the two condensers, corresponding to the rings C and D respectively, and the disk A, the E. M. F. being generated in the radii $a$ of the disk A between the two rings C and D which correspond to the portion of the circuit between the condensers in Fig. 6. Excitation of the coil F may be effected by an exciting coil F, G, such as that shown in Fig. 2. As before, a second set of rings and coils can be placed on the other side of the disk which greatly increases the efficiency of the machine. One advantage of the forms of construction shown in Figs. 4 and 5 is that as the only rotating part consists of a disk with radial conductors the same can withstand rotation at a high speed. I may, however, as shown in Fig. 7 employ a ring C and coil F on a disk 1 rotating in juxtaposition to and in the opposite direction to a ring $C^1$ and coil $F^1$ on a disk 2, the necessary motion being imparted to the coils and rings by power applied to the shafts 3 and 4 which carry the disks 1 and 2. It will be seen that this construction merely consists in connecting ring condenser plates or rings C, C' to the ends $f^1$ and $f^3$ of the wires F and F', the opposite ends of these wires being connected by brushes $f^2$ and $f^4$, respectively, to a slip ring R positioned concentrically with the axis of rotation of the parts, or as shown in Fig. 8, I may employ a pair of outside rings C, $C^1$ and a pair of inside rings D $D^1$ the coil F being connected at $f'$ and $f^2$ to the rings C and D, and the coil having its ends $f^2$ and $f^4$ connected to the rings C' and D', the rings C, D and C', D' being rotated in juxtaposition in opposite directions by motion imparted to the respective shafts 3 and 4.

For the production of long waves and a low frequency it is best to employ radially split rings in one piece connected by single coils of wire but where a higher frequency is desired, I divide the rings radially into several portions and wind the coils F with a corresponding number of wires in parallel each wire being connected to a segment of the rings. When the frequency is low enough I may employ carefully laminated iron to reduce the magnetic reluctance of the machine.

Fig. 9 shows a radial section of a portion of a machine constructed according to the principle represented diagramatically in Fig. 4. In this instance, the periphery of the disk A is revoluble in the gap formed between the juxtaposed rings C and C' which rings in this case are stationary or non-revoluble, and F $F^1$ are the coils or windings which, in this case, are formed of a number of copper strips suitably insulated and wound in spirals within the respective channels of oppositely facing laminated iron rings I $I^1$, the whole being inclosed in insulating ring shaped troughs T $T^1$, the disk A rotating between the rings C $C^1$ and the iron serving to conduct magnetic lines through the disk A at the point P. The circuit connections and the excitation in this instance may be the same as in Fig. 2, and the disk A may be mechanically driven in the same way.

In the manufacture of a machine according to this invention every precaution must be taken to reduce the high frequency resistance of the circuit by employing carefully stranded conductors or else copper strip. In each case there is a critical speed which must be reached before the oscillations will be maintained and the smaller the high frequency resistance of the circuit is made, the lower will be the critical speed required.

The actual windings of a machine constructed in accordance with the principles above set forth are shown in Figs. 10 and 11 which show a few of the windings of the disk or rotor and a few of the windings of the field or stator. It would confuse the figure to show more windings. Fig. 10 is a view seen from a point in line with the axis of the machine, the stator windings being shown in full lines and the rotor windings being shown in dotted lines, and Fig. 11 shows a section through the upper half of the machine in a vertical plane and through its axis.

The rotor winding consists of a large number of copper strips F E D C B A formed as shown with four right angle bends at E D C B (See Figs. 10 and 13). The portions F E and A B form when assembled two cylinders symmetrically arranged about the axis of the machine, the copper strips being arranged edgewise like the segments of a commutator only they are much thinner and more numerous. Such cylinders form the inner or rotating portion of what I term "hub" condensers. The radial portions E D and B C connect the hub condensers with the portions D C which when assembled form the inner cylindrical portion of what I term a peripheral condenser. The condenser surfaces are thus formed of the edges of the strips which are so numerous that a continuous cylindrical surface is formed at E F and A B and a more or less continuous surface at C D. It will be seen that the rotor strips lie entirely in radial planes about the axis of the rotor.

The stator is likewise wound with strips. Beginning with the axial extensions P, P, which form the stationary hollow cylindrical surface of the hub condenser the strips proceed in a plane parallel to the plane of rotation of the rotor in an outward spiral as for example to Q, (See Figs. 10 and 14) then radially outward to R. They then turn axially so as to come into the rotor plane and proceed on an inward spiral to S where their extremities form a hollow cylindrical surface which is the outer or stationary cylindrical surface of the peripheral condenser. The point S where the strip ends should lie on the same radius as the point P where the respective strip begins. As described above and shown in Fig. 11 a stator is arranged on each side of the rotor. By this construction an exceedingly low resistance machine is obtained as the strips are all in parallel, as more fully described in reference to Figs. 10 and 11. Suitable insulation is provided between the strips on both rotor and stator.

In order that the action of these windings may be clearly understood, I show a single stator winding in Fig. 12, in which a stator strip starting at the inner portion of the outer stationary part of the hub condenser at P spiralizes outward to Q, then runs radially to R, and spiralizes back inwardly to S, the points P and S thus forming a portion of the stationary parts of the hub and peripheral condensers respectively. The circuit thus formed is completed by the rotor radii B, C and D, E in which C, D forms part of the inner moving portion of the peripheral condenser. The oscillating circuit through this particular winding is as follows:—Starting at the inner surface of the hub condenser at A, the current flows to the peripheral condenser at C through the di-electric of this condenser to S and around the inductive circuit S R Q P and through the di-electric of the hub condensed back to A. The condenser elements A, C are in rapid rotation due to rotation imparted mechanically to the rotor by the shaft on which it is mounted, and the radial rotor windings are always cutting the lines produced by the current flowing in the circuit A, C S R Q P as induced by suitable excitation which, for example, may be effected by a coil F, G, as shown in Fig. 2, thereby generating the required E. M. F. to maintain the oscillations. In a machine as actually constructed there are thirty six hundred radial rotor windings and thirty six hundred of the corresponding stator windings. These windings are all in parallel and are composed of insulated copper strips, thus giving an exceedingly low resistance to the machine.

The only portions of the machine which rotate are the radial windings F, E, D, C, B, A, which are mounted in a slotted disk carried on a rotating shaft.

From the foregoing it will be understood, both from the diagrammatic Figs. 1–8 inclusive, and from Figs. 10–13 inclusive, which show the practical embodiment of the principles of the invention in a machine, that the oscillating circuit is composed of relatively movable or revoluble parts or sections the terminals of which sections are not connected directly but which are provided with juxtaposed surfaces with gaps between them, and these juxtaposed surfaces act in effect as an ordinary condenser acts in the usual oscillating circuit, that is, to provide capacity for the circuit, the gap between the relatively moving or revolving surfaces corresponding to the di-electric of the condenser, and the surfaces acting as the condenser electrodes act. In Figs. 10–13 inclusive, which show the invention as applied to a machine, two of these so-called condensers are provided at the hubs of the rotor and stator, these parts being termed "hub" condensers, and a similar condenser is provided between the peripheries of the rotor and stator and I term the latter the "peripheral" condenser.

In each instance, the oscillating circuit embodies an inductive winding to produce an oscillating field and a radial conductor or winding which cuts the lines of force of the oscillating field, the cutting of the lines of force of the oscillating field by the radial wires or conductors producing an E. M. F. which will act to sustain the oscillations established in the oscillating circuit.

In the constructional embodiment of the invention shown in Figs. 10–13 inclusive, Q represents the inductive winding of the oscillating circuit, this winding comprising a part of the stator while the rotor carries the radial wires or windings, the radial portions B, C and D, E of which cut the lines of force of the oscillating field.

Excitation of the oscillating circuit may be produced by any means known in the art, the coil F, G and connected circuits and parts being shown conventionally for this purpose in Figs. 2 and 4. Power may be taken from any of the embodiments shown by any means known in this art, a coil M, N being shown conventionally for this purpose in Figs. 2 and 4, this coil being coupled inductively to the oscillating circuit and being connected, for example, to an aerial.

What I claim is:

1. A dynamo for producing continuous electrical oscillations comprising rotor windings, stator windings the magnetic field of which is adapted to be cut by the rotor windings, and condensers with relatively moving surfaces for transferring the oscillating energy from the fixed to the moving windings whereby the loss due to the use of brushes is avoided.

2. A dynamo electric machine for producing electrical oscillations comprising relatively moving windings, surfaces connected to the said relatively moving windings forming condensers and serving to transfer energy from one winding to the other and at the same time forming an oscillating circuit of definite frequency.

3. A dynamo for producing continuous electrical oscillations comprising a rotor having hub and peripheral condenser parts, radial windings connected between said parts, and a stator having corresponding condenser parts and inductive windings connected between said last mentioned parts.

4. A dynamo electric machine for producing electrical oscillations comprising a stator and a rotor, surfaces upon said stator and rotor respectively, said surfaces forming condensers, one condenser being at the hub and the other condenser being at the periphery of said stator and of said rotor respectively, conductors joining said hub and peripheral condenser surfaces of the stator, and conductors joining said hub and peripheral condenser surfaces of the rotor.

In testimony whereof I have hereunto set my hand in presence of two subscribing witnesses.

EDWARD RUSSELL CLARKE.

Witnesses:
ERNEST JOHN HILL,
W. J. SKERTEN.

Copies of this patent may be obtained for five cents each, by addressing the "Commissioner of Patents, Washington, D. C."